United States Patent [19]

Mann

[11] Patent Number: 4,801,313
[45] Date of Patent: Jan. 31, 1989

[54] GAS PURIFICATION APPARATUS

[75] Inventor: David O. Mann, Hamilton, Ind.

[73] Assignee: Mann Technology Limited Partnership, Greenville, S.C.

[21] Appl. No.: 37,705

[22] Filed: Apr. 13, 1987

[51] Int. Cl.$^4$ .............................................. B01D 53/04
[52] U.S. Cl. ...................................... 55/179; 55/208;
 55/316; 55/500; 55/DIG. 17; 210/DIG. 5
[58] Field of Search ................... 55/35, 179, 180, 208,
 55/316, 500, DIG. 17; 210/DIG. 5

[56] References Cited

U.S. PATENT DOCUMENTS

| | | | |
|---|---|---|---|
| 2,747,681 | 5/1956 | Schurftan et al. | 55/180 |
| 3,252,270 | 5/1966 | Pall et al. | 55/316 X |
| 3,483,677 | 12/1969 | Pinto | 55/316 |
| 3,876,544 | 4/1975 | Fowler | 210/DIG. 5 |
| 4,043,774 | 8/1977 | McGrath | 55/316 X |
| 4,058,463 | 11/1977 | Bartik | 210/DIG. 5 |
| 4,240,908 | 12/1980 | Swain et al. | 210/DIG. 5 |
| 4,259,097 | 3/1981 | Pryel et al. | 55/DIG. 17 |
| 4,478,619 | 10/1984 | Avends et al. | 55/316 |
| 4,519,819 | 5/1985 | Frantz | 55/179 X |

OTHER PUBLICATIONS

Chemical Engineering Progress, vol. 62, Apr. 1966, pp. 60-65.

Primary Examiner—Charles Hart
Attorney, Agent, or Firm—Bailey & Hardaway

[57] ABSTRACT

A gas purification apparatus which is operable utilizing an upflow direct impingement coalescer. A central inlet in the lower portion of a column expands the flow of air and liquid droplets (vertical flow to horizontal separation). The droplets lose velocity and are impinged in the packing. Migration is first outward from the main gas flow and then downward. Finally, the liquids are drained at the bottom. A collar around the central inlet insures that liquid will not reenter into the central inlet.

7 Claims, 2 Drawing Sheets

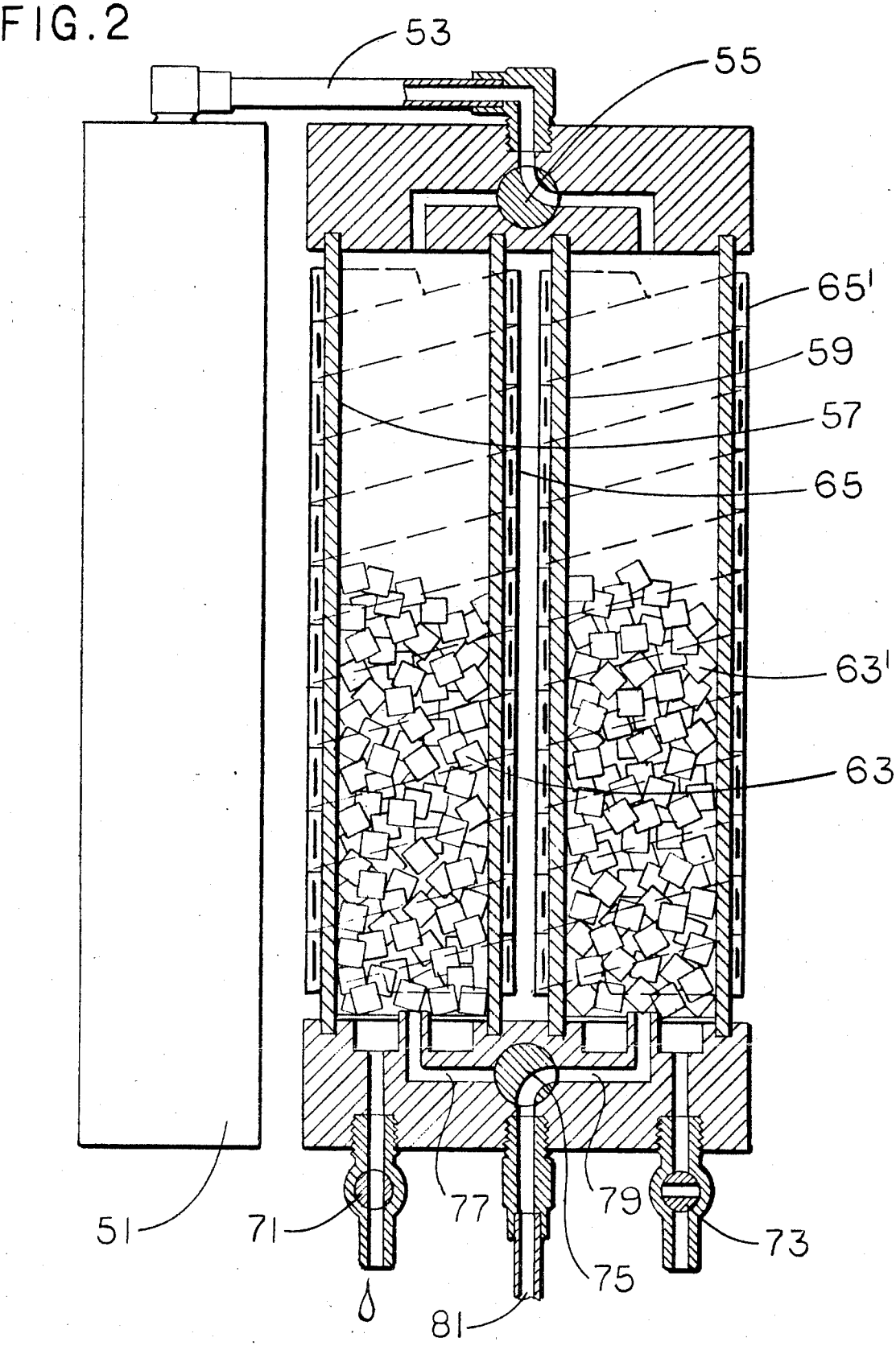

GAS PURIFICATION APPARATUS

BACKGROUND OF THE INVENTION

This invention relates generally to the art of gas purification and more particularly to a gas purification apparatus utilizing an upflow direct impingement coalescer.

Various apparatus exist in the prior art for purification of gases and particularly for the removal of sorbed otherwise liquid material therein. One such apparatus is described in U.S. Pat. No. 1,458,005 to Rohrer. Rohrer discloses an apparatus for removal of oil from compressed air wherein the air is passed vertically into an expansion chamber, passed through a filter to a supply hose. There is provided in the bottom of the expansion chamber a drain for removal of oil.

Persinger describes in U.S. Pat. No. 4,303,422 an apparatus for removing impurities from natural gas wherein the gas to be purified is passed upwardly and then transversely into an expansion chamber where it proceeds to pass through a molecular sieve thereabove. Contaminants can be removed from the bottom of the expansion chamber.

Clay et al describe in U.S. Pat. No. 4,162,904 a cyclone-type separator for gas purification and silencing.

Bauer describes an additional apparatus for removal of oil from compressed air as it leaves the compressor in U.S. Pat. No. 3,955,945.

Daniels describes in U.S. Pat. No. 2,691,425 a condenser-type air cleaner for removal of oil vapors from compressed gas.

Hasselwander describes in U.S. Pat. No. 2,606,628 a filter apparatus having a drain in the bottom thereof which utilizes a common member for both an inlet and outlet of the gas to be cleansed.

Beutelspacher describes in U.S. Pat. No. 609,493 an air purification unit for use with a beer pressurization pump for the removal of oil, water and solid impurities from the pressurized air.

The purification unit has a drain in the bottom thereof.

While these various prior art devices are operable for their intended functions, they do not possess the adaptability to be utilized in a variety of applications.

SUMMARY OF THE INVENTION

It is thus an object of this invention to provide a gas purification apparatus which may be utilized in a variety of applications.

It is a further object of this invention to provide such a gas purification apparatus which is operable without a sump so as to eliminate the batchwise collection of impurities removed from the gas.

It is a still further and more particular object of this invention to provide such a gas purification apparatus which may be coupled with other media to provide for removal of a variety of substances from the gas.

These as well as other objects are accomplished by a gas purification apparatus formed from a first vertical column having a bottom opening and a top opening with a vertically directed inlet in a central portion of the bottom opening for direct fluid communication into the hollow of the column. A drain basin is defined concentrically about the inlet which generally closes the bottom open end of the first column. A coalescing zone exists above the inlet which has a greater diameter than the diameter of the inlet. A second hollow vertical column is parallel to the first column with top and bottom openings also. A conduit connects the top of the second column so as to provide fluid communication thereto. A closure exists for the bottom of the second column which defines a gas exit therein. Various media may exist within the columns.

BRIEF DESCRIPTION OF THE DRAWINGS

FIG. 2 of the drawings is a view similar to FIG. 1 of an additional embodiment of this invention.

DETAILED DESCRIPTION

Figure 1:
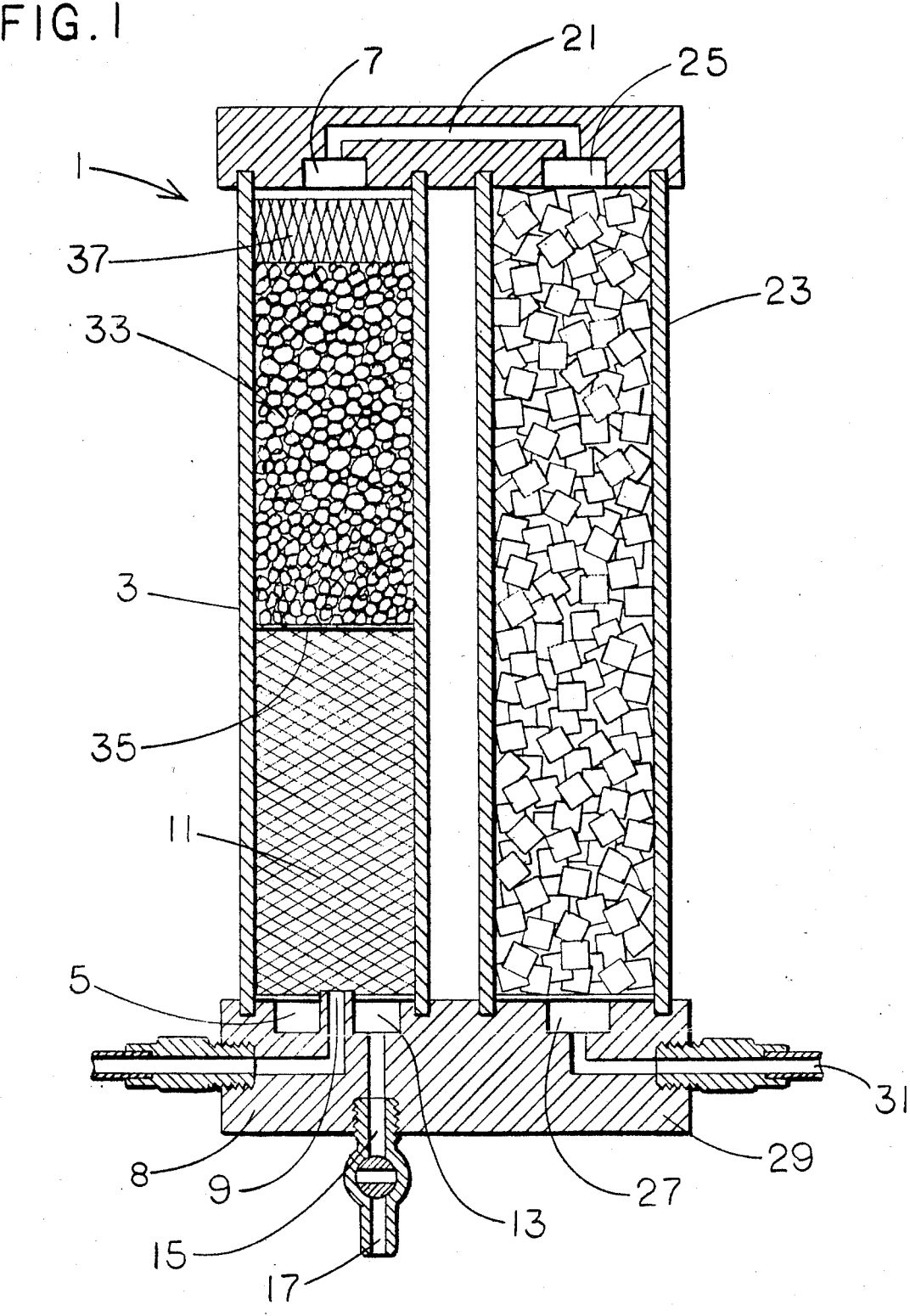
FIG. 1 of the drawings is a cross-sectional view of the gas purification apparatus of this invention.

In accordance with this invention it has been found that the combination of at least two parallel columns providing an upflow coalescer in one of the columns with a concentric drain in the bottom thereof provides greater flexibility of applications that has heretofore existed within the prior art. Various other advantages and features will become apparent from a reading of the following description given with reference to the various figures of drawing.

FIG. 1 of the drawings illustrates the gas purification apparatus 1 of this invention. The aqueous comprises a first vertical column 3 illustrated in cross-section. The column 3 has a bottom opening at 5 and a top opening at 7. Means 8 define an inlet 9 preferably in a central portion of column 3 and in a central portion of the bottom opening 5. The inlet 9 is vertically directed for direct fluid communication into the hollow of column 3. Inlet 9 directly contacts coalescing material 11 which is packed into the coalescing zone of column 3.

It should be noted that the coalescing zone packed with material 11 is of significantly greater diameter than inlet 9 so as to provide for a general lessening of velocity so as to provide for coalescing of such materials as moisture and oil vapor which will generally tend to move downwardly after coalescing upon coalescing material 11. Preferably, coalescing material 11 is a stranded coalescing material of the type cold under the designation "Goodloe."

Any coalesced material which moves downwardly within column 3 is collected within drain basin or collar 13 which is preferably a concentric indentation about inlet 9. Drain basin 13 communicates through 15 to exit port 17 which is preferably provided with a variable orifice valve to achieve equilibration during continuous operation and prevent accumulation of significant liquid within drain basin 13.

Column 3 communicates through conduit means 21 with a second column 23 having a top opening 25 and bottom opening 27. A closure 29 closes bottom opening 27 and defines an exit 31 therein for removal of purified gases. Second column 23 as well as portions of column 3 may be appropriately packed as is to be further described.

Column 3 may be packed above coalescing material 11 with granulated activated charcoal 33 which is preferably separated from coalescing material 11 by screen 35. The granulated activated charcoal is held in position within column 3 by a support 37 which will not allow migration of filter media or filtrate. Support 37 may be formed of HEPA.

The second column 23 may be filled with filler media to help remove undesireable gases. The filter media may be other material known as HEPA (high efficiency particulate filter) or also the material identified as HEIP.

A preferred form of this invention for the removal of moisture involves the use of a desiccant such as activated aluminum in second column 23. A preferred form of this arrangement is illustrated in FIG. 2 of the drawings wherein whole column 51 is illustrated and which is substantially identical to column 3 illustrated in FIG. 1 of the drawings. In this embodiment column 51 communicates through conduit means 53 with selective valve 55. Selective valve selectively directs the fluid substance coming through conduit means 53 to either of identical columns 57 or 59. Both columns 57 and 59 contain a desiccant such as activated aluminum 63 and 63'. Both columns contain heaters such as coil heaters at 65 in column 57 and 65' in column 59. Both columns 57 and 59 have drains similar to those illustrated in FIG. 1 respectively at 71 and 73. Upon adjustment of valve 55, either column 57 or 59, whichever is not being utilized, may have the desiccant 63 or 63' regenerated by activation of respective heating coils 65 or 65' to cause moisture therein to flow through the appropriate drain 71 or 73.

An additional selective valve 75 is illustrated in communication with conduit means 77 of column 57 or 79 of column 59. Valve 75 is selectively adjusted in coordination with valve 55 so as to provide for communication with the appropriate column. Thus, gas passing through valve 55 and into column 59 would pass into conduit 79 into valve and out outlet 81.

With this arrangement columns 57 and 59 are periodically switched so that the used desiccant is regenerated by heat therein and the moisture drained away so that the column will be ready for use when the mating column becomes near saturation.

It is thus seen that a novel gas purification apparatus is provided by this invention having the ability to be utilized in a variety of applications. Such applications include removal of moisture and/or oil from compressed air as well as general applications for the removal of undesireable contaminants.

Since the above description is exemplary in nature, many modifications thereof will become apparent to those of skill in the art from a reading thereof. Such variations are included within the spirit and scope of this invention as defined by the following appended claims.

What is claimed is:

1. An apparatus for removing contaminants from a gaseous stream, comprising:
   a first hollow vertical column having a bottom opening and a top opening;
   means defining an inlet in a central portion of said bottom opening, said inlet being vertically directed for fluid communication directly into the hollow of said first column;
   means defining a drain basin generally concentrically located about said means defining an inlet and otherwise closing said open end;
   a coalescing zone in said hollow above said inlet of greater diameter than said inlet;
   granulated activated charcoal above said coalescing zone;
   a filter above said granulated activated charcoal;
   a second hollow vertical column parallel to said first column having top and bottom openings therein;
   conduit means connecting said top opening of said first column to said top opening of said second column; and
   means for closing the bottom opening of said second column and defining an exit therein.

2. The apparatus according to claim 1 wherein said coalescing zone is packed with stranded coalescing material.

3. The apparatus according to claim 1 further comprising a catalyst within said second column to assist in removal of contaminants from said gas.

4. The apparatus according to claim 1 further comprising
   a desiccant in said second column; and
   a heater in said second column for periodic activation to reactivate said desiccant upon saturation thereof with moisture.

5. The apparatus according to claim 4 further comprising a third vertical column parallel to said first and second column having a top opening and a bottom opening;
   second conduit means communicating said third column with said first and second column;
   means in said second conduit means for establishing fluid communication either between said first column and said second column or said first column and said third column;
   a desiccant in said third column similar to the desiccant in said second column;
   a heater in said third column similar to the heater in said second column whereby said second conduit means and said second and third columns may be alternately reactivated while the other column is in use;
   means connecting the bottom opening of said third column with the outlet of said second column; and
   means for removing moisture from said second and third columns upon reactivation of desiccant in said second and third columns.

6. An apparatus for removing liquid and other contaminants from a gaseous stream, comprising:
   a first hollow vertical column having a bottom opening and a top opening;
   means defining an inlet in said bottom opening, said inlet being vertically directed for admitting said gaseous stream directly into the hollow of said first column;
   a coalescing zone containing stranded coalescing material extending about said means defining an inlet into which said gaseous stream is directly received from said means defining an inlet in said hollow above said inlet of greater diameter than said inlet removing liquid and other contaminants from said gaseous stream;
   activated charcoal above said coalescing zone;
   means for maintaining said activated charcoal in a confined area within said column;
   means defining a drain basin located beneath said means defining an inlet and closing said open end receiving said liquid and other contaminants from said gaseous stream removed in said coalescing zone; and
   a drain in said drain basin for removal of said liquid and other contaminants received in said drain basin.

7. An apparatus for removing liquid and other contaminants from a gaseous stream, comprising:

a first hollow vertical column having a bottom opening and a top opening;

means defining an inlet in a central portion of said bottom opening, said inlet being vertically directed for admitting said gaseous stream directly into the hollow of said first column;

a coalescing zone containing stranded coalescing material extending about said means defining an inlet into which said gaseous stream is directly received from said means defining an inlet in said hollow above said inlet of greater diameter than said inlet removing liquid and other contaminants from said gaseous stream;

activated charcoal above said coalescing zone;

means for maintaining said activated charcoal in a confined area within said column;

means defining a drain basin located beneath said means extending thereabout defining an inlet and closing said open end receiving said liquid and other contaminants removed from said gaseous stream in said coalescing zone;

drainage means in said drain basin for removal of said liquid and other contaminants received in said drain basin;

a second hollow vertical column having top and bottom openings therein;

filter media contained in said second column for removing particulate matter from said gaseous stream; and means introducing said gaseous stream into said second column on one side of said filter media after it has passed through said coalescing material and removing said gaseous stream from said second column after it has passed through said filter media.

* * * * *